July 23, 1968 H. F. IRVING 3,393,425
APPARATUS FOR FORMING AND COOLING PELLETS
Filed June 16, 1965 2 Sheets-Sheet 1
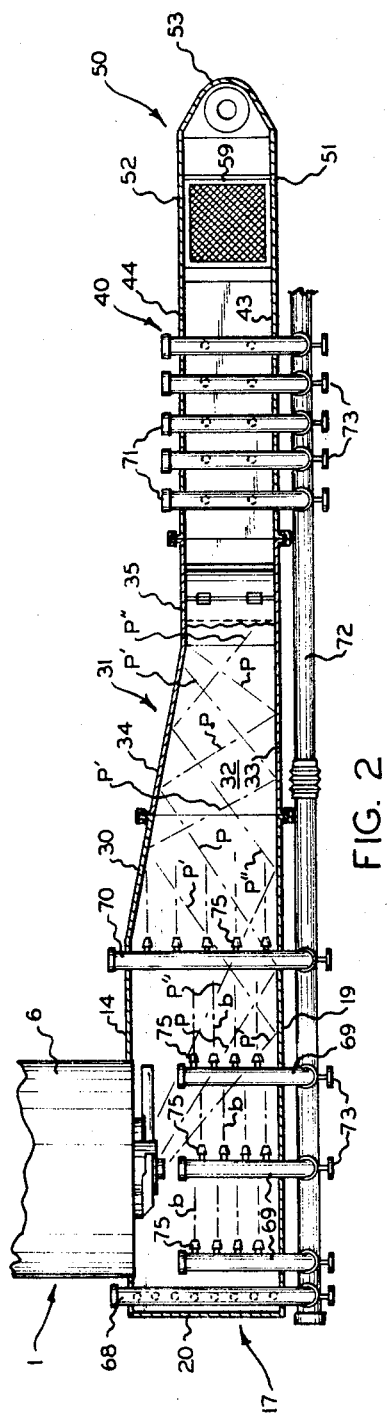
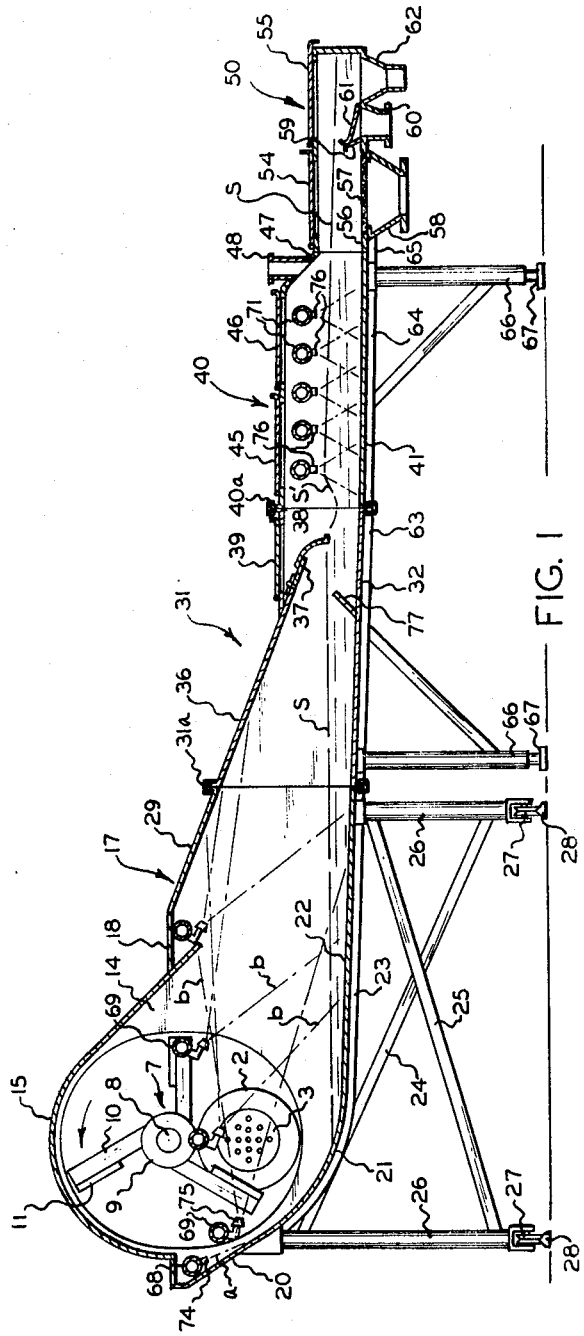
INVENTOR.
HENRY F. IRVING
BY
Learman, Learman & McCulloch
ATTORNEYS July 23, 1968          H. F. IRVING          3,393,425

APPARATUS FOR FORMING AND COOLING PELLETS

Filed June 16, 1965          2 Sheets-Sheet 2

INVENTOR.
HENRY F. IRVING
BY

*Learman, Learman & McCulloch*
ATTORNEYS

United States Patent Office 3,393,425
Patented July 23, 1968

3,393,425
APPARATUS FOR FORMING AND
COOLING PELLETS
Henry F. Irving, Saginaw, Mich., assignor to Baker
Perkins Inc., Saginaw, Mich., a corporation of New
York
Filed June 16, 1965, Ser. No. 464,421
18 Claims. (Cl. 18—12)

ABSTRACT OF THE DISCLOSURE

Apparatus for cooling hot extruded and pelletized plastic strand material wherein an exteriorly mounted cutter at a die propels the pellets along a generally horizontal aerial pathway and wherein nozzle means discharges a succession of sprays to cool said pallets while they are deflected to cause them to follow a zigzag path, and a trough assembly captures the sprays and incorporates means for maintaining the pellets submerged.

---

This invention relates to apparatus for forming and cooling pellets cut from extruded plastic materials, and more particularly to apparatus enabling heated pellets to be cooled to a temperature at which they will not agglomerate, without slowing the rate of delivery of such pellets to their destination.

In the preparation of plastic materials for further processing or storage it frequently is desirable to pelletize the materials. Various kinds of pelletizing apparatus have been proposed heretofore which are capable of mixing the plastic ingredients, extruding the mixed substance in strands and simultaneously cutting the strands into pellets. Examples of such apparatus are disclosed in United States Patents Nos. 2,614,290 and 3,143,766.

Plastics are extruded from such apparatus at elevated temperatures and the pellets cut from the extruded materials are normally tacky and tend to agglomerate, rather than remain discrete. Such agglomerated pellets are objectionable for many reasons, and various proposals have been advanced heretofore for preventing agglomeration. Not all of the earlier proposals have been entirely satisfactory, however. For example, it is not sufficient merely to cool the outer surface of a pellet without effecting a reduction in temperature of the material at the interior of the pellet inasmuch as the higher temperature of the core material frequently is capable of re-heating the outer surface of the pellet to the point where it again becomes tacky. Moreover, in those instances where the cooling of pellets forms part of a continuous process, any delay in the movement of the pellets slows the entire process.

A prime object of the invention is to provide apparatus capable of reducing the temperature of heated pellets throughout the body of the latter to a level such that they will not adhere to similar pellets, and to do so without effecting any appreciable delay in the movement of the pellets.

A further object of the invention is to provide pellet cooling apparatus in which the pellet forming means is arranged to fling the pellets in such a manner as to assist in cooling them.

Another object of the invention is to provide a multiple stage cooling apparatus for heated pellets in which cooling medium supplied upstream of the flow of pellets is further utilized downstream to assist in maintaining the flow of pellets and in their further cooling.

Other objects and advantages of the invention will be pointed out in detail or will become apparent from the following description when it is considered in conjunction with the appended claims and the accompanying drawings, in which:

FIGURE 1 is a vertical sectional view of apparatus constructed in accordance with the invention;

FIGURE 2 is a horizontal sectional view of the apparatus shown in FIGURE 1;

Figure 3:
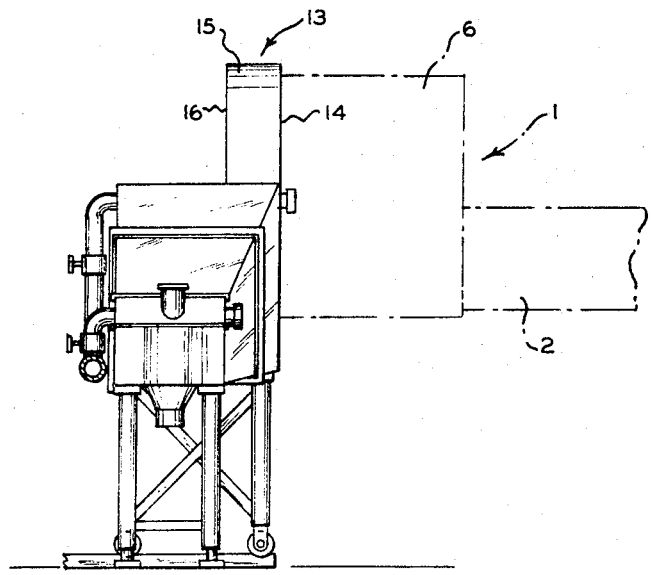
FIGURE 3 is a fragmentary, end elevational view of the apparatus as viewed from the right-hand end of FIGURE 1.
Figure 4:
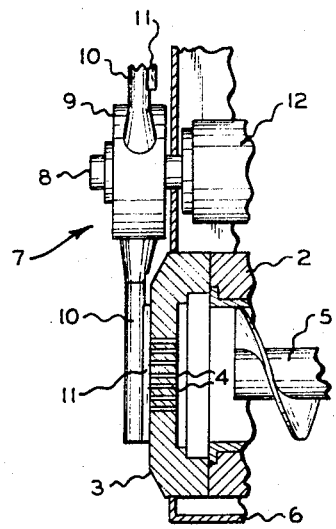
FIGURE 4 is an enlarged, sectional view taken on the line 4—4 of FIGURE 1.

Apparatus constructed in accordance with the invention is adapted for use in conjunction with plastic extruding apparatus generally designated 1 which may be any one of a number of conventional types having a cylindrical body 2 in which plastic material may be mixed and fed toward a die 3 having a plurality of orifices 4 therein and through which strands of material may be continuously extruded at the proper viscosity, temperature and pressure by means of a continuously driven feed screw 5 of known construction. The screw 5 may be a reciprocating and rotating screw of interrupted design such as shown in Irving, United States Patent No. 3,023,-455. The outer face of the die 3 preferably is planar. The extruder 1 and its associated parts thus far described are conventional and may be of the kind disclosed in the aforementioned patents.

The forward end of the cylinder 2 preferably is enclosed within a housing 6 in which is mounted rotary cutter means generally designated 7 for cutting extruded strands of material into substantially uniform pellets. The cutter means may be of the kind disclosed in United States Patent No. 3,143,766 and to which reference may be had for a more detailed disclosure. Briefly, however, the cutter 7 comprises a driven shaft 8 adjacent one end of which is fixed a socket member 9 in which is mounted a plurality of generally radially extending cutting blades 10 having beveled cutting edges 11. The blades 10 may be adjusted inwardly or outwardly of the socket member and they may be adjusted about their own axes so as to position their cutting edges 11 at such an angle to the face of the die 3 as to assure clean cutting of the pellets and to prevent the cut pellets from sticking to the blade. The cutter shaft 8 is journaled in a cylindrical housing 12 and is rotated by means of an electric motor (not shown).

As is best shown in FIGURE 1, the cutter shaft 8 is mounted directly above the extruder cylinder 2 so that the longitudinal center lines of the cutter shaft and the cylinder 2 lie in the same vertical plane. The shaft 8 is rotated in a counterclockwise direction as viewed in FIGURE 1 so that each of the blades 10 passes in succession across the outer surface of the die 3 to shear strands of plastic issuing through the orifices 4 and form pellets.

The extruder apparatus 1 extends into a hood generally designated 13 having a wall 14 with an opening to accommodate the housing 6. The hood also has a curved top wall 15 and a front wall 16. The wall 14 of the hood is vertical and a portion of it also forms one side wall of a laterally extending integral housing generally designated 17. The lower ends of the curved wall 15 and the wall 16 of the hood 13 are joined to the top wall 18 of the housing 17, and the wall 18 is joined to the wall 14 and to a vertical side wall 19 of the housing 17 which parallels and is spaced from the side wall 14. One end of the housing 17 is closed by an end wall 20 which is curved adjacent its lower end as at 21 to merge smoothly with a linear bottom wall 22. The opposite end of the housing 17 is open. The housing 17 is supported on frame members 23, 24 and 25 that are mounted on legs 26 which preferably are provided with rollers 27 at their lower end which may ride upon rails 28 and enable the housing to be shifted from place to place. Adjacent the open end of the housing 17, the horizontal top wall 18 of the housing is joined to a downwardly inclined wall portion 29, and the side wall 14 is joined to an inwardly inclined wall portion 30 that converges toward the wall 19.

Joined to the open end of the housing 17 as at 31a is another housing generally designated 31 having a bottom wall 32 extending in prolongation of the bottom wall 22 and a side wall 33 extending in prolongation of the wall 19. The housing 31 has an opposite wall 34 which extends partially in prolongation of the wall 30, but terminates in an end portion 35 that parallels the wall 33. The top wall 36 of the housing 31 continues along the line of inclination of the wall 30 and terminates in a free end 37 on which an arcuate baffle member 38 is slidably mounted. An inspection door 39 is hingedly mounted on the wall 36 so as to close the upper part of the housing 31 but provides access thereto when desired.

Connected as at 40a to the housing 31 is another housing or trough member generally designated 40 which has a bottom wall 41 extending substantially in prolongation of the bottom wall 32 and side walls 43 and 44 extending in prolongation of the walls 33 and 35, respectively. The top of the housing 40 is closed by a pair of hinged doors 45 and 46 which may be opened to provide access to the housing 40. Further, the forward end of the housing 40 has a downwardly inclined top wall portion 47 in which is located a vent pipe 48.

Joined to the forward end of the trough 40 is another housing generally designated 50 having side walls 51 and 52 extending in prolongation of the walls 43 and 44 and terminating in a forwardly tapered end wall 53. The top of the housing 50 normally is closed by a pair of pivoted doors 54 and 55.

The housing 50 has a bottom wall 56 with an opening adjacent the rear end of the housing 50 which is covered by a screen 57. Beneath the screen is a discharge chute 58. At the forward end of the screen is an upstanding baffle 59 that extends the full width of the housing 50 and to a height a little less than half the distance between the top and bottom walls. Forwardly of the baffle 59 is an outlet chute 60 that normally is closed by a hinged door 61, and forwardly of the chute 60 is another discharge chute 62.

The housings 31, 40 and 50 are supported on frame members 63, 64 ad 65 which in turn are supported on legs 66 having vertically adjustable feet 67. The supporting legs are so adjusted that the wall 32 is located at substantially the same inclination as the linear bottom wall 22 of the housing 17. The wall 41, however, preferably is at a slightly less inclination than the wall 32, and the bottom wall of the housing 50 preferably is horizontal.

A plurality of transversely extending pipes 68, 69 and 70 are mounted in the housing 17 and a plurality of pipes 71 are transversely mounted in the housing 40. Each of the pipes is connected to a delivery pipe 72 which parallels the respective housings and is adapted to deliver cooling fluid, such as water, to each of the transverse pipes. The delivery of fluid to any of the pipes 70 and 71 may be regulated by a valve 73 associated with each pipe and the temperature and pressure at which the fluid is delivered may be controlled by conventional pumps and cooling devices (not shown).

The pipe 68 is equipped with a plurality of downwardly projecting nozzles 74 through which fluid may be discharged in a stream as at a to the bottom of the housing 17. Each of the pipes 69 and 70, however, is provided with a plurality of adjustable spray-producing nozzles 75, each of which produces a flat, fan-shaped spray b. Each of the nozzles 75 is so mounted in its associated pipe that the spray discharged through it lies in a substantially vertical plane. Each nozzle also is so oriented that the spray therefrom will be directed generally in a direction parallel to side wall 19, as is indicated by the abbreviated chain lines in FIGURE 2.

Each of the pipes 71 supports a plurality of nozzles 76 throught which cooling fluid may be discharged in a cone-shaped spray pattern substantially vertically downwardly as is indicated in chain lines in FIGURE 1.

In the operation of the apparatus, plastic material such as polyethylene, polystyrene, or polypropylene, for example, is extruded through the orifices 4 in the die 3, and the cutter 7 is rotated at a rapid speed so as to cause each of the blades 10 to pass in succession past the orifices 4 and cut the ribbons of material into pellets. Since the axis of rotation of the cutter 7 is directly above the longitudinal axis of the extruder cylinder 2, and since the rotation of the cutter is counterclockwise, as viewed in FIGURE 1, and since each blade is beveled as is indicated at 11, each pellet severed from the material being extruded will be propelled forwardly and substantially horizontally transversely of the housing 17 along an aerial path through the sprays of cooling fluid. The pellets move in successive sheets in the zigzag pattern indicated in FIGURE 2 at P, P', and P'', and while the sprays tend to slow them they do not appreciably deflect them. The speed of propulsion of each pellet is a function of its size and the rate of rotation of the cutter 7, and the speed of rotation of the cutter should be sufficient to cause each pellet to travel at such speed that it rebounds from the side wall 19 to the side wall 34, and from the wall 34 to the wall 33, and so on as it moves forwardly along the apparatus. The aerial paths of the pellet are indicated by the reference characters P, P', and P'' in FIGURE 2.

The construction of the housing 31 is such that the distance between the walls 33 and 34 gradually decreases, thereby facilitating rebounding of the pellets off the opposite side walls. The engagement of the pellets with the side walls and the movement of the pellets through the sprays effect deceleration of the pellets so that they are directed finally into the coolant stream just upstream of a dam 77 with the aid of the forces of gravity. Moreover, the inclination of the wall portions 29 and 36 assures that each pellet will be in a sufficiently vertically lowered position by the time it approaches the baffle 38.

During the operation of the apparatus, the fluid discharged from the pipes 68, 69 and 70 collects on the bottom wall 22 and, due to the inclination of the latter and to the direction in which the nozzles are aimed, forms a stream S which moves from left to right as viewed in FIGURES 1 and 2. The height of the stream may vary, but it will be greater than the height of the plate or dam 77 which extends upwardly from the bottom wall 32 of the housing 31 adjacent the forward end of the latter. The dam 77 assures the collection of a quantity of cooling fluid on the bottoms of the housings 17 and 31 which may have about a 2 degree downward slope.

By the time each pellet arrives at the forward end of the housing 31, it will have passed through the sprays issuing from the nozzles 75 so that its outer surface will be cooled to a temperature such that it will not tend to agglomerate with others. As each pellet approaches the forward end of the housing 31 it will have been decelerated and captured by the stream in such manner that it will be moving immersed in the upper portion of the stream of fluid flowing along the apparatus. Some of the pellets will have been captured forwardly of dam 77 and will be carried over the dam 77 and under the baffle 38. Other pellets will have finally been decelerated by the adjustable baffle 38 and will drop into the stream S just downstream of dam 77. The dam and the baffle cooperate to create turbulence in the stream downstream of the dam 77 (note the dip in the level of the stream at S'), and the turbulence prevents the pellets from rising to the surface of the stream. As the stream flows continuously toward the forward end of the trough or housing 40, each pellet moves under the nozzles 76 from which cooling fluids is sprayed with such pressure as to submerge any pellets which tend to rise to the surface of the stream. Thus, throughout the cooling operation, the pellets are not permitted to rise to the surface and float until they are at such a reduced temperature that the surfaces they expose to air will not be heated up and become tacky. Finally the entire pellets are cooled to the point where the outer surface, when exposed to air, has no tendency to reheat from within and agglomerate.

From the trough 40 the stream, together with entrained pellets, passes through the discharge housing 50. A substantial quantity of the liquid is discharged through the screen 57 which reduces the height of the stream in the housing 50, but not to such level that pellets floating on the surface cannot pass over the barrier 59 and into the discharge spout 62. Water discharged through the screen 57 may be recirculated or otherwise disposed of, whereas water and pellets discharged through the spout 62 may be introduced to a conveying screen or the like (not shown) for separation of the pellets from the water.

In the event that the pellets are unsatisfactory for some reason, as, for instance, sometimes occurs at the start of a run when blending in the continuous mixer is not sufficiently accomplished, the gate 61 may be swung clockwise from the position shown in FIGURE 1 so as to cause the pellets and the fluid bypassing the screen 57 to be discharged through the chute 60 for subsequent processing.

In the practice of the invention, the movement of the pellets along their aerial paths is quite rapid, thereby avoiding interference among them during the pelletizing operation. Moreover, even though the movement of the pellets in the aerial path is quite rapid, each pellet is subjected to a cooling bath which immediately cools their outer surfaces or skins inasmuch as each pellet immediately passes through the sprays b of cooling fluid.

The construction of the forward end of the chamber 17 and the connecting end of the chamber 31 is such that the overall cross-sectional area of the chamber 31 gradually is reduced so as to accelerate the speed of movement of the stream of liquid, thereby preventing any undue piling up of pellets in the housing 31. However, the speed of movement of the stream, coupled with the submersion of each pellet in the stream, is such that by the time each pellet is discharged its arverage temperature is such as to preclude its adhering to other pellets.

The apparatus has worked well with polyethylene and polypropylene to gradually cool the pellets from a die expressing temperature in the neighborhood of 350°–400° F. to an average (skin-core) exit temperature at 130° F. Because the sprays b are directed away from the die 3, the die can be maintained at the proper temperature for extrusion. This is possible because the axis of rotation of the knife which is moving at about 1200 r.p.m. is vertically above the axis of the die and the pellets are flung generally horizontally or laterally and ricochet off the side walls of the housing rather than being flung downwardly and splashing moisture up on the outer face of the die. With a lateral path the length of the path can be long enough so that the pellets pass through sufficient spray to cool them enough so that they are casehardened by the time they drop into the stream of coolant in the region of dam 77, where they may have an average (inside-outside) temperature of 180°–200° F. From this point further cooling lowers the core temperature of the pellets sufficiently so the cores do not heat up the skins again and cause them to become tacky.

The disclosed apparatus and method are representative of presently preferred forms of the invention, but are intended to be illustrative rather than definitive thereof. The invention is defined in the claims.

What is claimed is:

1. Apparatus for cooling heated pellets, comprising means for propelling said pellets along a zigzag aerial path; nozzle means through which cooling fluid may be discharged in a succession of sprays; and means mounting said nozzle means in a position such that sprays discharged therefrom lie in different portions of the zigzag path of said pellets.

2. Apparatus for cooling heated pellets comprising means for propelling said pellets along an aerial path including means for deflecting said pellets to cause them to travel at an angle to said path; nozzle means through which cooling fluid may be discharged in a succession of sprays; means mounting said nozzle means in a position such that a spray discharged therefrom lies in the path of pellets traveling in said path and a second spray lies in the path of pellets deflected to travel at said angle; and trough means in the path of said pellets and downstream from said nozzle means for containing a quantity of cooling fluid in which said pellets may be immersed.

3. Apparatus for cooling heated pellets comprising means for propelling said pellets along an aerial path; nozzle means through which cooling fluid may be discharged in a spray; means mounting said nozzle means in a position such that a spray discharged therefrom lies in the path of said pellets; trough means in the path of said pellets and downstream from said nozzle means for containing a quantity of cooling fluid in which said pellets may be immersed; additional nozzle means through which cooling fluid may be discharged; and means mounting said additional nozzle means in a position such that fluid discharged therefrom is directed toward the surface of fluid in said trough means to impinge upon and sink pellets at said trough means.

4. The apparatus set forth in claim 3 including discharge means in said trough means downstream of said additional nozzle means and through which fluid and said pellets may be discharged.

5. Apparatus for forming and cooling heated pellets comprising die means having an outer face; means for extruding material through said die means in a strand; means for cutting said strand into pellets; means for aerially propelling said pellets along a path and deflecting them at an angle to said path; nozzle means through which a cooling fluid may be discharged in a spray; and means mounting said nozzle means in a position such that a spray discharged therefrom lies in the aerial path of said pellets and a second spray lies in the path of said deflected pellets.

6. Apparatus as set forth in claim 5 wherein said path is generally horizontal and outwardly oblique relative to said die means.

7. Apparatus set forth in claim 6 wherein said deflecting means comprises a barrier located in the aerial path of said pellets for striking thereby.

8. Apparatus as set forth in claim 5 wherein said cutting means comprises said propelling means.

9. Apparatus as set forth in claim 8 wherein said cutting means comprises rotatable knife means having an axis of rotation in vertical alignment with the center of the die means; means mounting said knife means for rotation adjacent the outer face of said die means; and means for rotating said knife means.

10. Apparatus for forming and cooling heated pellets comprising die means having an outer face; means for extruding material through said die means in a strand; means for cutting said strand into pellets and aerially propelling them; generally horizontal, downwardly inclined tunnel means for directing pellets along a path; nozzle means through which a cooling fluid may be discharged in a spray; means mounting said nozzle means in a position such that a spray discharged therefrom lies in the aerial path of said pellets; and trough means in the path of said pellets and downstream from said nozzle means for collecting the liquid from said sprays and consequently containing a quantity of cooling fluid in which said pellets may be immersed.

11. Apparatus for forming and cooling heated pellets comprising die means having an outer face; means for continuously extruding material through said die means in a strand; means for continuously cutting said strand into pellets; means for aerially propelling said pellets along a path; nozzle means through which a cooling fluid may be discharged in a spray; means mounting said nozzle means in a position such that a spray discharged therefrom lies in the aerial path of said pellets; downwardly inclined trough means in the path of said pellets and downstream from said nozzle means for containing a quantity of cooling fluid in which said pellets may be immersed; means delivering stream of fluid to said trough means upstream from the path of said pellets proceeding from said die means; dam means in said trough means for maintaining a designated level and creating downstream turbulence; additional nozzle means through which cooling fluid may be discharged; and means mounting said additional nozzle means in a position such that fluid discharged therefrom is directed toward the surface of fluid in said trough means to impinge upon and sink pellets at said trough means.

12. The apparatus set forth in cluaim 11 including discharge means in said trough means downstream of said additional nozzle means and through which liquid and said pellets may be discharged.

13. Apparatus for cooling heated pellets severed from a strand of heated material extruded through a die having a substantially planar face, said apparatus comprising means for propelling said pellets along an aerial path extending initially obliquely away from the plane of said die face; housing means having spaced apart walls which said pellets may strike and rebound from one to another; nozzle means through which a cooling fluid may be discharged in a spray; means mounting said nozzle means in such position that a spray discharged therefrom lies in said aerial path; trough means having a bottom for collecting fluid discharged from said nozzle means; and means mounting said trough means beneath said path and in a position to receive said pellets.

14. The apparatus set forth in claim 13 including additional nozzle means through which fluid may be discharged in a spray; and means mounting said additional nozzle means in such position that the spray discharged therefrom is directed toward the bottom of said trough means.

15. Apparatus for forming and cooling heated pellets comprising die means having an outer face; means for extruding material through said die means in strands; means for cutting said strands into pellets; trough means having a liquid pool for collecting said pellets; and nozzle means mounted in a position such that fluid discharged therefrom is directed toward the surface of liquid in said trough means to impinge upon and sink pellets in said pool.

16. The combination defined in claim 10 in which dam means is provided between said trough means and tunnel means and said tunnel means is of decreasing dimension.

17. Apparatus for cooling heated pellets severed from strands of heated material extruded forwardly through a die having extruding ports in a substantially planar front face, said apparatus comprising: said die; means for propelling said pellets along an aerial path extending initially obliquely away from the plane of said die face; generally longitudinally extending housing means, extending generally transversely from the die ports and die, and having front, rear, top, and bottom wall portions defining a tunnel down which pellets are deflected when flung in said aerial path; and nozzle means, extending generally parallelly to said front and rear walls and through which a cooling fluid may be discharged in a spray, disposed on the opposite side of said die from said tunnel and directing cooling fluid in a spray intersecting said initially oblique portion of the path of said pellets.

18. Apparatus as set forth in claim 17 in which said nozzle means comprises a series of front-to-rear spaced nozzles mounted on a coolant supply pipe.

References Cited
UNITED STATES PATENTS

| | | | |
|---|---|---|---|
| 2,286,405 | 6/1942 | Gordon | 18—12 X |
| 2,539,916 | 1/1951 | Ludington et al. | 18—12 |
| 2,614,290 | 10/1952 | Street. | |
| 2,618,013 | 11/1952 | Weigand et al. | 18—2.5 |
| 2,811,748 | 11/1957 | Smith | 264—13 |
| 3,196,192 | 7/1965 | Vruggink et al. | |
| 3,241,948 | 3/1966 | Clarborne et al. | 264—13 |
| 3,143,766 | 8/1964 | Rohn. | |
| 3,215,094 | 11/1965 | Oldershaw et al. | |
| 2,622,273 | 12/1952 | Detwiler. | |
| 2,862,243 | 12/1958 | Farr et. al. | |

FOREIGN PATENTS

| | | |
|---|---|---|
| 1,377,421 | 9/1964 | France. |
| 382,427 | 11/1964 | Switzerland. |

WILLIAM J. STEPHENSON *Primary Examiner.*